US012737213B2

(12) United States Patent
Nagarnaik et al.

(10) Patent No.: US 12,737,213 B2
(45) Date of Patent: Sep. 15, 2026

(54) FLEXIBLE MEMORY MANAGEMENT FOR VIRTUAL MACHINES

(71) Applicant: Google LLC, Mountain View, CA (US)

(72) Inventors: Vaibhav Balwant Nagarnaik, Santa Clara, CA (US); Rahul Chaturvedi, Mountain View, CA (US); Steven Aaron Richman, San Francisco, CA (US)

(73) Assignee: Google LLC, Mountain View, CA (US)

( * ) Notice: Subject to any disclaimer, the term of this patent is extended or adjusted under 35 U.S.C. 154(b) by 401 days.

(21) Appl. No.: 18/505,014

(22) Filed: Nov. 8, 2023

(65) Prior Publication Data

US 2025/0147786 A1 May 8, 2025

(51) Int. Cl.
*G06F 9/455* (2018.01)

(52) U.S. Cl.
CPC .................... *G06F 9/45558* (2013.01); *G06F 2009/45583* (2013.01)

(58) Field of Classification Search
CPC ................... G06F 9/45558; G06F 2009/45583
See application file for complete search history.

(56) References Cited

U.S. PATENT DOCUMENTS 8,583,875 B1 * 11/2013 Garthwaite ............. G06F 12/08 711/6
9,910,768 B1 3/2018 Melekhova et al.
9,910,774 B1 * 3/2018 Gupta ................... G06F 12/023
10,474,359 B1 * 11/2019 Volpe .................... G06F 3/0644
12,367,056 B2 * 7/2025 Apfelbaum ............. G06F 9/455
2012/0233435 A1 * 9/2012 Ben-Yehuda ......... G06F 9/5022 711/170
2016/0253263 A1 * 9/2016 Takada ................ G06F 12/0871 711/119
2019/0149399 A1 * 5/2019 Reed .................. H04L 41/0895 709/223

(Continued)

FOREIGN PATENT DOCUMENTS

CN 116991537 A * 11/2023 ......... G06F 9/45558
WO WO-2013103341 A1 * 7/2013 ......... G06F 12/1425
WO WO-2015132753 A1 * 9/2015 ........... G06F 9/5016

OTHER PUBLICATIONS

Kim J, Fedorov V, Gratz PV, Reddy AN. Dynamic memory pressure aware ballooning. InProceedings of the 2015 International Symposium on Memory Systems Oct. 5, 2015 (pp. 103-112). (Year: 2015).*

(Continued)

*Primary Examiner* — James R Turchen
(74) *Attorney, Agent, or Firm* — Shumaker & Sieffert, P.A.

(57) ABSTRACT

A virtual machine monitor (VMM) of a computing system may provide flexible memory management for guest virtual machines (guest VMs). The VMM may allocate a flexible amount of memory that is accessible to a guest VM. A guest VM may be configured, such as by VMM, to utilize a larger fixed amount of guest memory. A memory access error may be generated when guest VM accesses a memory location outside of the flexible memory. The VMM may receive the memory access error and allocate additional memory including at least the memory location to the flexible memory. The memory location may then be accessed without triggering a failure.

15 Claims, 3 Drawing Sheets

(56) References Cited

U.S. PATENT DOCUMENTS

2019/0361728 A1* 11/2019 Kumar .................... H04L 67/34
2020/0192579 A1 6/2020 Cavilla et al.
2022/0171644 A1* 6/2022 Hildenbrand ....... G06F 9/45558
2023/0315561 A1* 10/2023 Wang .................. G06F 11/0709
714/6.3

OTHER PUBLICATIONS

Li X, Chen R, Zhang B, Li C. A Dynamic Memory Allocation Approach Based on Balloon Technology on Virtualization Platform. InJournal of Physics: Conference Series Feb. 1, 2019 (vol. 1169, No. 1, p. 012038). IOP Publishing. (Year: 2019).*
Moniruzzaman AB. Analysis of memory ballooning technique for dynamic memory management of virtual machines (vms). arXiv preprint arXiv: 1411.7344. Nov. 26, 2014. (Year: 2014).*
Github, "VirtIO Memory Ballooning", Apr. 18, 2022, 4 pp., Retrieved from the Internet https://pmhahn.github.io/virtio-ballon/#:~: text= VirtIO%20provides%20Memory%20Ballooning%3A%20the,other%20tasks%20inside%20the%20 VM . . . .

* cited by examiner

FLEXIBLE MEMORY MANAGEMENT FOR VIRTUAL MACHINES

BACKGROUND

A host computer may run one or more virtual machines (VMs), each with independent operating systems and functionality. VMs may be a software-based "virtual" version of a computing device with dedicated amounts of host computing system processor, memory, and storage resources. Typically, each VM is configured with a set amount of memory such that, during bootup, the host computing system allocates the set amount of host memory. However, allocating this fixed amount of host memory does not result in efficient nor flexible use of host memory resources.

SUMMARY

Various aspects of the techniques are directed to flexible memory management for virtual machines. Rather than allocating a fixed amount of memory at boot-up of a virtual machine, techniques for this disclosure enable a virtual machine manager to dynamically adjust the amount of memory allocated to each virtual machine, while the virtual machine is executing on the host computing system, based on events generated by the virtual machine (e.g., when trying execute an instruction) and/or signals indicating high memory pressure. For example, if a virtual processor of a guest virtual machine executing on the host computing system causes an exit event when attempting to access a particular memory location, the virtual machine manager may receive the error, allocate additional memory to the guest virtual machine, and complete the memory access that triggered the event in such a manner as to be transparent to the guest virtual machine and without requiring the guest virtual machine to be reconfigured and/or rebooted. Such flexible memory management techniques may thereby improve the use of host memory resources.

In one example, various aspects of the techniques are directed to a method comprising: allocating, by a virtual machine monitor executing at a host computing system, an amount of memory for a guest virtual machine, the amount of memory being less than a maximum amount of memory the guest virtual machine is configured to utilize, wherein the host computing system provides an execution environment for the guest virtual machine; and after starting a boot process of the guest virtual machine: responsive to an attempt to access a memory location of the guest virtual machine that is unallocated, receiving, by the virtual machine monitor, a memory access error that includes an indication of the memory location that was attempted to be accessed; responsive to receiving the memory access error, allocating, by the virtual machine monitor, additional memory for the guest virtual machine, wherein the additional memory includes the memory location; and accessing, by the virtual machine monitor, the memory location.

In another example, various aspects of the techniques are directed to a computing system comprising: a memory that stores instructions; and one or more processors that execute the instructions to: allocate an amount of memory for a guest virtual machine, the amount of memory being less than a maximum amount of memory the guest virtual machine is configured to utilize, wherein the computing system provides an execution environment for the guest virtual machine; and after starting a boot process of the guest virtual machine: responsive to an attempt to access a memory location of the guest virtual machine that is unallocated, receive a memory access error that includes an indication of the memory location that was attempted to be accessed; responsive to receiving the memory access error, allocate additional memory for the guest virtual machine, wherein the additional memory includes the memory location; and access the memory location.

In another example, various aspects of the techniques are directed to non-transitory computer-readable storage medium comprising instructions, that when executed by one or more processors of a computing system, cause the one or more processors to: allocate an amount of memory for a guest virtual machine, the amount of memory being less than a maximum amount of memory the guest virtual machine is configured to utilize, wherein the host computing system provides an execution environment for the guest virtual machine; and after starting a boot process of the guest virtual machine: responsive to an attempt to access a memory location of the guest virtual machine that is unallocated, receive a memory access error that includes an indication of the memory location that was attempted to be accessed; responsive to receiving the memory access error, allocate additional memory for the guest virtual machine, wherein the additional memory includes the memory location; and access the memory location.

The details of one or more examples of the subject matter of this specification are set forth in the accompanying drawings and the description below. Other features, aspects, and advantages of the subject matter will become apparent from the description, the drawings, and the claims.

DETAILED DESCRIPTION

Figure 1:
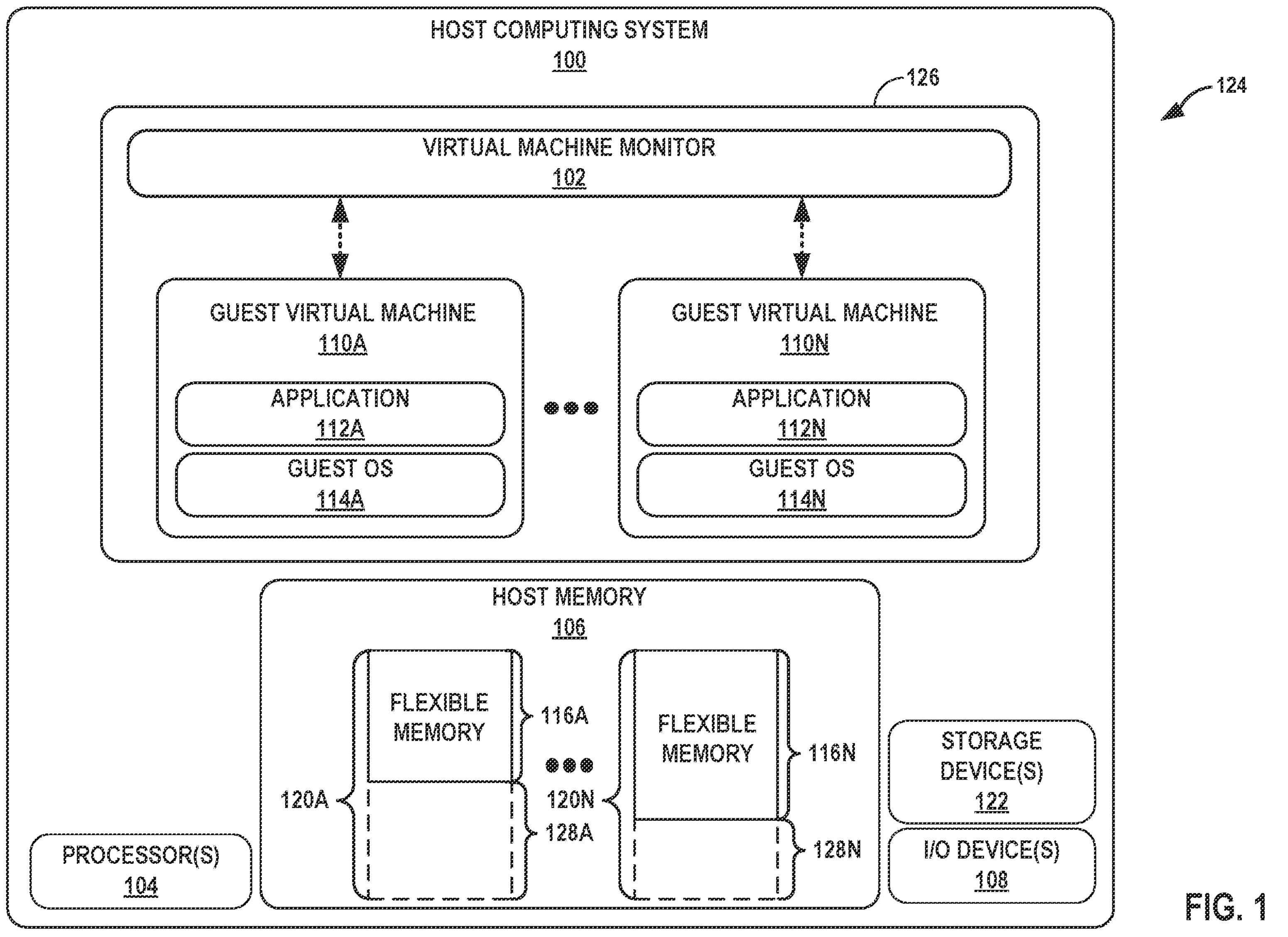
FIG. 1 is a conceptual diagram illustrating an example environment for flexible memory management for virtual machines, in accordance with one or more aspects of the present disclosure.

FIG. 1 is a conceptual diagram illustrating an example environment for flexible memory management for virtual machines, in accordance with one or more aspects of the present disclosure. Virtual machine memory management environment 124 may include one or more guest virtual machines (guest VMs) 110 executing on host computing system 100. Guest VMs 110 may be logically isolated from one another and have independent operating systems 114, applications 112, and guest memory 120, which may all share physical resources (one or more processors 104, host memory 106, storage devices 122, and one or more I/O devices 108) of host computing system 100.

A management layer may be provided between operating system 126 of host computing system 100 and guest VMs 110 to manage the guest VMs and the physical resources that they share. In the example of FIG. 1, virtual machine monitor (VMM) 102, provides a management layer. In some examples, VMM 102 may monitor the amount of available host memory 106 at host computing system 100 to allocate to guest VMs 110 and perform allocation and deallocation of memory relative to guest VMs.

Host computing system 100 may provide an execution environment for one or more guest VMs 110 and VMM 102. In some examples, the execution environment may comprise an operating system 126 running VMM 102 and one or more guest VMs 110. In operation, VMM 102 may be a management layer between operating system 126 and one or more guest VMs 110. VMM 102 may communicate with operating system 126, such as through one or more system or API calls to perform its management functions.

Host computing system 100 may represent any suitable computing system, such as one or more desktop computers, laptop computers, mainframes, servers, cloud computing systems, etc. capable of sending and receiving information both to and from a network. In some examples, the components of host computing system 100 illustrated in FIG. 1 may reside and execute on the same or separate computing devices and systems operated by and/or under the control of one or more entities. In some examples, host computing system 100 may represent one or more cloud computing systems that provide access to their respective services via a cloud.

One or more processors 104 may implement functionality and/or execute instructions within host computing system 100. For example, one or more processors 104 of host computing system 100 may receive and execute instructions stored by storage devices 122 that provide the functionality of VMM 102, guest VM 110, and operating system 126. These instructions executed by one or more processors 104 may cause host computing system 100 to store and/or modify information, within storage devices 122 during program execution. One or more processors 104 may execute instructions of VMM 102, guest VM 110, and operating system 126. That is, VMM 102, guest VM 110, and operating system 126 may be operable by one or more processors 104 to perform various functions described herein.

One or more processors 104 may be or include a digital signal processor (DSP), a general purpose microprocessor, application specific integrated circuit (ASIC), field programmable logic array (FPGA), and/or other equivalent integrated or discrete logic circuitry. One or more I/O devices 108 of host computing system 100 may be configured to receive input. Examples of input are tactile, audio, and video input. I/O devices 108 of host computing system 100, in one example, includes a presence-sensitive display, touch-sensitive screen, mouse, keyboard, voice responsive system, video camera, microphone or any other type of device for detecting input from a human or machine.

In some examples, host memory 106 is a temporary memory, meaning that a primary purpose of host memory 106 is not long-term storage. Host memory 106 on host computing system 100 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

One or more storage devices 122 within host computing system 100 may store information for processing during operation of host computing system 100. That is, host computing system 100 may store data accessed by VMM 102, guest VM 110, and operating system 126 during execution at host computing system 100. In some examples, one or more storage devices 122 are a temporary memory, meaning that a primary purpose of one or more storage device 122 is not long-term storage. One or more storage devices 122 on host computing system 100 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

One or more storage devices 122, in some examples, also include one or more computer-readable storage media. One or more storage devices 122 may be configured to store larger amounts of information than volatile memory. One or more storage devices 122 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. One or more storage devices 122 may store program instructions and/or information (e.g., data) associated with VMM 102, guest VM 110, and operating system.

One or more I/O devices 108 of host computing system 100 may be configured to generate output. Examples of output are tactile, audio, and video output. I/O devices 108 of host computing system 100, in one example, includes a presence-sensitive organic light emitting diode (OLED) display, sound card, video graphics adapter card, speaker, monitor, a presence-sensitive liquid crystal display (LCD), or any other type of device for generating output to a human or machine.

Typically, during the boot process of a virtual machine, a virtualization layer will, as a memory management technique, allocate a fixed amount of memory to the virtual machine. Allocating a fixed amount of memory is generally an inefficient use of memory that may lead to memory contention between virtual machines. In addition, if the virtual machine attempts to perform an instruction on memory not allocated to it, the instruction will fail.

Another typical memory management technique involves the use of virtual balloon drivers. Virtual balloon drivers are installed on the operating system of a virtual machine after boot and operate based on pressure stall information. Pressure stall information indicates what level of memory pressure (e.g., normal, low, severe, or critical) a virtual machine is experiencing. For example, severe or critical may indicate the need for more memory at the virtual machine, while normal or low may indicate the virtual machine may not require all the memory currently allocated to it. Based on the pressure stall information, a virtualization layer typically may allocate less guest memory, i.e., deallocate memory, to the virtual balloon, "deflating" the virtual balloon, or allocate more guest memory to the virtual balloon, "inflating" the virtual balloon.

The amount of memory allocated to a virtual machine may be inversely proportional to the amount of memory allocated to a virtual balloon. Once memory is allocated to the virtual balloon it may be inaccessible to the virtual machine, allowing this memory to be used by other virtual machines. If the virtual balloon is "deflated" (reducing the memory allocated to the virtual balloon) and there is insufficient memory available to allocate to the virtual machine, instructions that require more memory than currently allocated to the virtual machine will fail.

In accordance with the flexible memory management techniques for virtual machines described in the present disclosure, guest VMs 110 may perform an instruction on memory that is currently unallocated thereto without failure.

This flexibility allows memory to be more efficiently allocated as will be described below.

In some examples, VMM 102 may allocate memory to guest VM 110. As shown in FIG. 1 for example, VMM 102 may allocate an amount of memory represented by flexible memory 116. In some examples, allocation of memory to guest VM 110 may occur by adjusting the amount of memory at a virtual balloon 128, such as by allocating or deallocating memory relative to the virtual balloon.

In some examples, allocation and deallocation of memory by VMM 102 may occur through communication between VMM and operating system 126. VMM 102 may, for example, make a system or API call to operating system 126 to allocate and deallocate guest memory 120 and flexible memory 116 from host memory 106.

In some examples, guest VM 110 may receive an indication, such as from VMM 102, that it has been allocated guest memory 120 even though guest VM has only actually been allocated the amount of memory represented by flexible memory 116. In other examples, guest VM 110 may be configured, such as by VMM 102, to utilize guest memory 120 even though guest VM has only actually been allocated the amount of memory represented by flexible memory 116.

It therefore appears to guest VM 110A that guest memory 120A has been allocated; however, guest VM 110A has actually only been allocated the amount of memory represented by flexible memory 116A. As such, in some examples, the amount of host memory 106 physically allocated to guest VM 110A is represented by flexible memory 116A, though it appears to guest VM that the amount of memory represented by guest memory 120A has been allocated.

In some examples, VMM 102 may allocate an amount of flexible memory 116 to guest VM 110 that is less than a maximum amount or size of guest memory 120 that guest VM is configured to utilize. As shown in FIG. 1 for example, guest memory 120A of host memory 106 is larger than flexible memory 116A for guest VM 110A.

During the boot process, guest VM 110A may execute an instruction that accesses unallocated memory relative to guest VM. For example, the instruction executed by guest VM 110A may access a memory location within guest memory 120A but outside of flexible memory 116A.

Access to unallocated memory may generate a memory access error. For example, a memory access error may be generated when an instruction is executed at a memory location outside flexible memory 116 or when a memory location outside flexible memory is accessed by an instruction. A memory access error may identify the memory location.

VMM 102 may receive the memory access error and, in response, may allocate additional memory for guest VM 110. In some examples, VMM 102 may allocate additional memory, including at least the memory location associated with the memory access error. In some examples, the additional memory may be allocated from available host memory 106, which may, in some cases, include at least a portion of guest memory 120 outside of flexible memory 116. As described above, the allocated memory becomes part of flexible memory 116A and can therefore be used by guest VM 110A without failure, such as to complete one or more instructions.

Guest VM 110 may not receive the memory access error. For example, VMM 102 may intercept the memory access error before it is received by guest VM 110. An instruction that would otherwise fail due to a memory access error may be prevented from failure in this manner.

For example, after receiving a memory access error and allocating additional memory at or including the memory location, VMM 102 may prevent the instruction from failing by accessing the memory location to complete the instruction that triggered the memory access error. Guest VM 110 does not receive the memory access error in such case and may then continue its operation without failure. For example, guest VM 110 may then continue the boot process. As such, the allocation of additional memory, at or including the memory location, may be transparent to guest VM 110.

In some examples, after booting, guest VM 110 may remain configured to utilize a maximum amount of memory even when a smaller amount of memory has actually been allocated. As shown in FIG. 1 for example, it appears to guest VM 110 that a maximum amount of memory, as represented by guest memory 120A, has been allocated even when the smaller amount of memory represented by flexible memory 116A has actually been allocated.

In operation, VMM 102 may allocate up to the maximum amount of memory to guest VM 110 in response to memory pressure at guest VM. For example, launching applications 112 may require increased memory, thereby increasing memory pressure at guest VM 110. In response, VMM 102 may allocate additional flexible memory 116A to guest VM 110 for use up to the maximum amount represented by guest memory 120A. When memory pressure at guest VM 110 is reduced, VMM 102 may deallocate flexible memory 116, which frees additional host memory 106 for other purposes.

Virtual balloon 128 may be implemented at guest VM 110 to effectuate this allocation and deallocation process. As shown in FIG. 1, in some examples, virtual balloon 128A may be represented by the amount of memory in guest memory 120A that is not occupied by flex memory 116A. In this context, "inflating" and "deflating" virtual balloon 128A respectively increases and decreases memory pressure at guest memory 116A.

Virtual balloon 128 may "inflate" and "deflate" to control memory pressure at guest VM 110. For example, the virtual balloon may "inflate" to increase memory pressure at guest VM 110 thereby causing guest operating system 114 to reduce memory pressure, such as by terminating processes, moving data to one or more swap files, or both. In this example, virtual balloon 128 may "deflate" as well, thereby decreasing memory pressure and allowing one or more applications 112 or other elements of guest VM 110 to utilize additional memory. This flexible use of memory results in efficient memory management with reduced memory contention between guest VMs 110.

In some aspects of the techniques described in the present disclosure, VMM 102 may prevent instruction failures through virtual balloon allocation and deallocation events. For example, VMM 102 may not deallocate memory from virtual balloon 128 when there is insufficient host memory 106 available to allocate to guest VM 110. VMM 102 may determine the amount of available memory of host computing system 100, such as by identifying available host memory 106 through operating system 126. If the available memory is insufficient to satisfy the amount of memory to be deallocated from virtual balloon 128, VMM will not "deflate" or deallocate memory from virtual balloon. In this manner, guest VM 110 can complete instructions on memory not allocated to it without failure.

Figure 2:
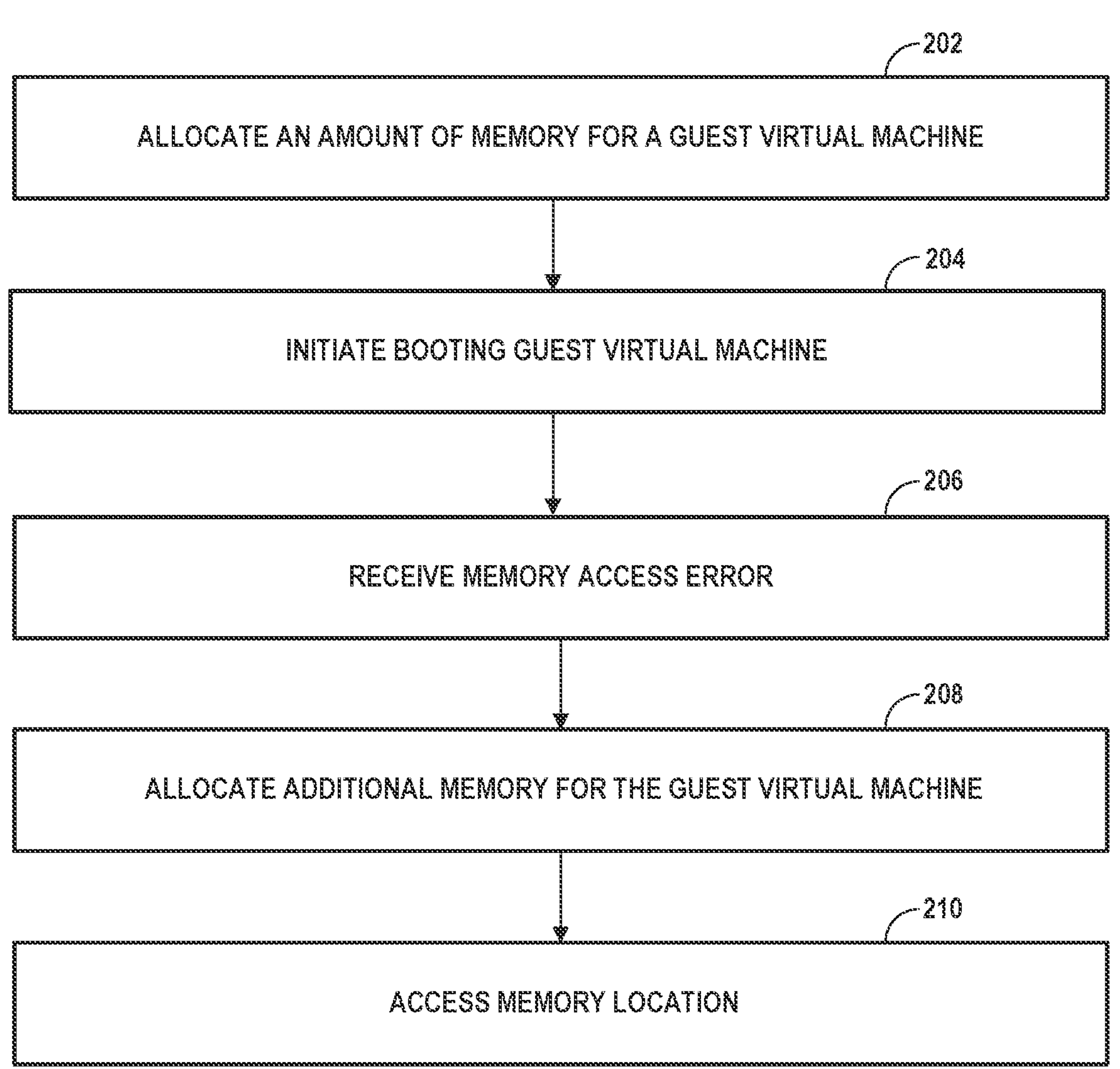
FIG. 2 is a flowchart of an example process for flexible memory management for virtual machines, in accordance with one or more aspects of the present disclosure.

FIG. 2 is a flowchart of an example process for flexible memory management for virtual machines, in accordance with one or more aspects of the present disclosure. FIG. 2 is described in the context of FIG. 1.

In some examples, an amount of memory may be allocated to guest VM 110 (202). VMM 102 may, for example, allocate an amount of memory represented by flexible memory 116 to guest VM 110 (202). Guest VM 110 may then be booted (204). For example, VMM 102 may initiate a boot sequence of guest VM 110 (204).

Guest VM 110 may cause a memory access error such as by executing an instruction that accesses unallocated memory. In some examples, this may occur when guest VM 110 executes an instruction that accesses a memory location outside of flexible memory 116, even though the memory location may appear to be within guest memory 120. The memory access error may be received or intercepted (206). For example, VMM 102 may receive or intercept the memory access error (206).

In response to receiving the memory access error, VMM 102 may allocate additional memory to guest VM 110 at or including the memory location (208), such as from available host memory 106. The additional allocated memory may become part of flexible memory 116. The memory location may then be accessed (210). Guest VM 110, VMM 102, or both may access the memory location (210), such as to complete the instruction that generated the memory access error.

Figure 3:
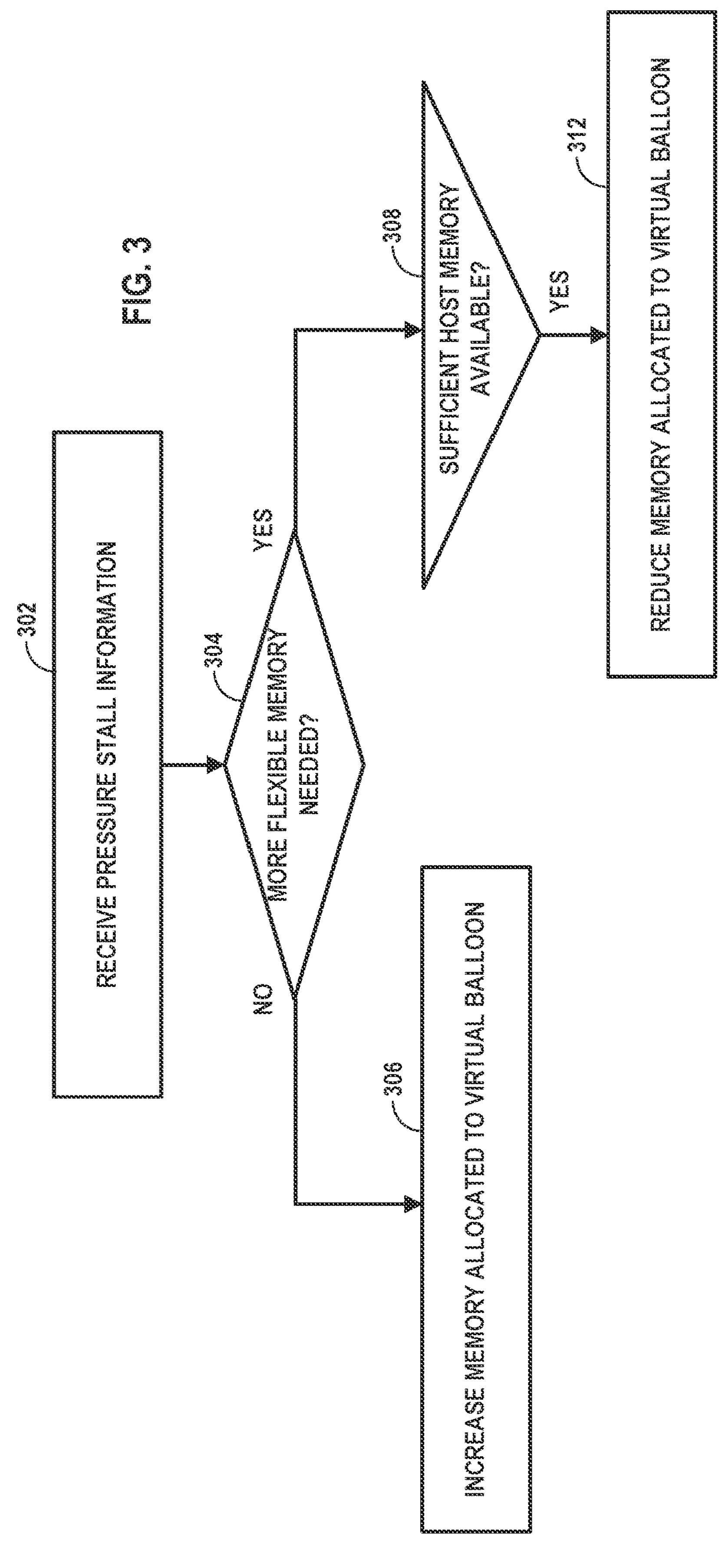
FIG. 3 is a flowchart of an example process for flexible memory management for virtual machines, in accordance with one or more aspects of the present disclosure.

FIG. 3 is a flowchart of an example process for flexible memory management for virtual machines, in accordance with one or more aspects of the present disclosure. FIG. 3 is described in the context of FIG. 1.

In some examples, pressure stall information may be received (302) to determine whether to "inflate" or "deflate" a virtual balloon 128 (304). For example, VMM 102 may receive pressure stall information (302) associated with guest VM 110 that indicates memory pressure at guest VM. In some examples, VMM 102 may monitor memory pressure at guest VM 110, such as by periodically retrieving pressure stall information from operating system 126 or through receipt of event notifications providing pressure stall information from operating system.

VMM 102 may determine whether additional memory should be allocated or deallocated at virtual balloon 128 based on the pressure stall information (304). This allows the amount of memory allocated to guest VM 110 to be selectively adjusted. For example, pressure stall information may indicate whether memory pressure is at normal, low, severe, or critical levels. VMM 102 may allocate or deallocate memory at virtual balloon 128 only at one or more particular levels. When memory pressure is severe or critical, virtual balloon 128 may be "deflated" by VMM 102 to allow additional memory to be allocated to guest VM 110. When memory pressure is at normal or low, VMM 102 may "inflate" virtual balloon 128 causing guest VM 110 to reduce memory utilization.

For instance, a game or other application 112 may require increased memory when launching, leading to increased memory pressure. After exit, application 112 may require little or no memory, leading to decreased memory pressure. Virtual balloon 128 may be adjusted based on the pressure stall information relating to the same.

When additional memory is not required, memory may be allocated to "inflate" virtual balloon 128 (306). When additional memory is required, memory may potentially be deallocated from virtual balloon 128. In some examples, VMM 102 may determine if sufficient host memory 106 is available (308), such as through a system call to operating system 126, and deallocate memory from virtual balloon 128 if so (312), or refrain from adjusting the amount of memory allocated to the virtual balloon if not. VMM 102 may determine sufficient host memory 106 is not available when available host memory does not satisfy a threshold amount of available memory.

As can be seen, the amount of memory allocated to guest VM 110 may be selectively adjusted in various ways. For example, the amount of memory allocated to guest VM 110 may be selectively adjusted based on pressure stall information (304), available host memory 106 (308), or both.

Example 1: A method includes allocating, by a virtual machine monitor executing at a host computing system, an amount of memory for a guest virtual machine, the amount of memory being less than a maximum amount of memory the guest virtual machine is configured to utilize, wherein the host computing system provides an execution environment for the guest virtual machine; and after starting a boot process of the guest virtual machine: responsive to an attempt to access a memory location of the guest virtual machine that is unallocated, receiving, by the virtual machine monitor, a memory access error that includes an indication of the memory location that was attempted to be accessed; responsive to receiving the memory access error, allocating, by the virtual machine monitor, additional memory for the guest virtual machine, wherein the additional memory includes the memory location; and accessing, by the virtual machine monitor, the memory location.

Example 2: The method of example 1, wherein accessing the memory location completes an instruction being executed by the guest virtual machine that triggered the memory access error.

Example 3: The method of example 1, wherein allocating the additional memory for the guest virtual machine comprises causing, by the virtual machine monitor, the host computing system to allocate the additional memory by at least adjusting an amount of memory allocated to a virtual balloon.

Example 4: The method of example 3, wherein the virtual machine monitor determines whether the amount of available memory of the host computing system satisfies a threshold amount of available memory before any adjustment of the amount of memory allocated to the virtual balloon.

Example 5: The method of example 1, further includes monitoring, by the virtual machine monitor, memory pressure of the guest virtual machine, and selectively adjusting, based on the memory pressure, the amount of memory allocated to the guest virtual machine.

Example 6: The method of example 5, wherein selectively adjusting the amount of memory allocated to the guest virtual machine comprises: responsive to determining, based on the memory pressure, that the guest virtual machine is to be allocated additional memory, reducing, by the virtual machine monitor, the amount of memory allocated to a virtual balloon, wherein the amount of memory allocated by a host computing system to the guest virtual machine is inversely proportional to the amount of memory allocated to the virtual balloon.

Example 7: The method of example 6, wherein selectively adjusting the amount of memory allocated to the guest virtual machine comprises: responsive to determining, based on the memory pressure, that the amount of memory allocated to the guest virtual machine can be reduced, increasing, by the virtual machine monitor, the amount of memory allocated to the virtual balloon, wherein the amount of memory allocated by a host computing system to the guest virtual machine is inversely proportional to the amount of memory allocated to the virtual balloon.

Example 8: The method of example 6, further includes responsive to the virtual machine monitor adjusting the amount of memory allocated to the virtual balloon, receiving, an updated memory pressure, and selectively adjusting, based on the updated memory pressure, the amount of memory allocated to the guest virtual machine.

Example 9: The method of example 6, further includes determining, by the virtual machine monitor, an amount of available memory of the host computing system; and refraining from reducing the memory allocated to the virtual balloon in response to determining that the amount of available memory of the host computing system does not satisfy a threshold amount of available memory.

Example 10: A computing system includes a memory that stores instructions; and one or more processors that execute the instructions to: allocate an amount of memory for a guest virtual machine, the amount of memory being less than a maximum amount of memory the guest virtual machine is configured to utilize, wherein the computing system provides an execution environment for the guest virtual machine; and after starting a boot process of the guest virtual machine: responsive to an attempt to access a memory location of the guest virtual machine that is unallocated, receive a memory access error that includes an indication of the memory location that was attempted to be accessed; responsive to receiving the memory access error, allocate additional memory for the guest virtual machine, wherein the additional memory includes the memory location; and access the memory location.

Example 11: The computing system of example 10, wherein accessing the memory location completes an instruction being executed by the guest virtual machine that triggered the memory access error.

Example 12: The computing system of example 10, wherein allocating the additional memory for the guest virtual machine comprises allocating the additional memory by at least adjusting an amount of memory allocated to a virtual balloon.

Example 13: The computing system of example 12, wherein the one or more processors further execute the instructions to determine whether the amount of available memory of the computing system satisfies a threshold amount of available memory before any adjustment of the amount of memory allocated to the virtual balloon.

Example 14: The computing system of example 10, wherein the one or more processors further execute the instructions to: monitor memory pressure of the guest virtual machine, and selectively adjust, based on the memory pressure, the amount of memory allocated to the guest virtual machine.

Example 15: The computing system of example 14, wherein selectively adjusting the amount of memory allocated to the guest virtual machine comprises: responsive to determining, based on the memory pressure, that the guest virtual machine is to be allocated additional memory, reducing the amount of memory allocated to a virtual balloon, wherein the amount of memory allocated by a host computing system to the guest virtual machine is inversely proportional to the amount of memory allocated to the virtual balloon.

Example 16: The computing system of example 15, wherein selectively adjusting the amount of memory allocated to the guest virtual machine comprises: responsive to determining, based on the memory pressure, that the amount of memory allocated to the guest virtual machine can be reduced, increasing the amount of memory allocated to the virtual balloon, wherein the amount of memory allocated by a host computing system to the guest virtual machine is inversely proportional to the amount of memory allocated to the virtual balloon.

Example 17: The computing system of example 15, further includes responsive to adjusting the amount of memory allocated to the virtual balloon, receiving an updated memory pressure, and selectively adjusting, based on the updated memory pressure, the amount of memory allocated to the guest virtual machine.

Example 18: The computing system of example 15, wherein the one or more processors further execute the instructions to: determine an amount of available memory of the computing system; and refraining from reducing the memory allocated to the virtual balloon in response to determining that the amount of available memory of the host computing system does not satisfy a threshold amount of available memory.

Example 19: A non-transitory computer-readable storage medium includes allocate an amount of memory for a guest virtual machine, the amount of memory being less than a maximum amount of memory the guest virtual machine is configured to utilize, wherein the computing system provides an execution environment for the guest virtual machine; and after starting a boot process of the guest virtual machine: responsive to an attempt to access a memory location of the guest virtual machine that is unallocated, receive a memory access error that includes an indication of the memory location that was attempted to be accessed; responsive to receiving the memory access error, allocate additional memory for the guest virtual machine, wherein the additional memory includes the memory location; and access the memory location.

Example 20: The non-transitory computer-readable storage medium of example 19, wherein the one or more processors further execute the instructions to: monitor memory pressure of the guest virtual machine; responsive to determining, based on the memory pressure, that the guest virtual machine is to be allocated additional memory, reduce the amount of memory allocated to a virtual balloon, wherein the amount of memory allocated by a host computing system to the guest virtual machine is inversely proportional to the amount of memory allocated to the virtual balloon; determine an amount of available memory of the computing system; and refrain from reducing the memory allocated to the virtual balloon in response to determining that the amount of available memory of the computing system does not satisfy a threshold amount of available memory.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise random-access memory (RAM), read-only memory (ROM), EEPROM, compact disc read-only memory (CD-ROM) or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of a computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structures or any other structures suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of inter-operative hardware units, including one or more processors as described above, in conjunction with suitable software and/or firmware.

Various embodiments have been described. These and other embodiments are within the scope of the following claims.

What is claimed is:

1. A method comprising:

allocating, by a virtual machine monitor executing at a host computing system, an amount of memory for a guest virtual machine, the amount of memory being less than a maximum amount of memory the guest virtual machine is configured to utilize, wherein the host computing system provides an execution environment for the guest virtual machine; and after starting a boot process of the guest virtual machine:

monitoring, by the virtual machine monitor, memory pressure of the guest virtual machine;

responsive to an attempt to access a memory location of the guest virtual machine that is unallocated, receiving, by the virtual machine monitor, a memory access error that includes an indication of the memory location that was attempted to be accessed;

responsive to determining, by the virtual machine monitor, that an amount of available memory of the host computing system satisfies a threshold amount of available memory:

responsive to receiving the memory access error and based on the memory pressure, allocating, by the virtual machine monitor, additional memory for the guest virtual machine by reducing an amount of memory allocated to a virtual balloon, wherein the additional memory includes the memory location, and wherein the amount of memory allocated to the guest virtual machine is inversely proportional to the amount of memory allocated to the virtual balloon, wherein the additional memory is not allocated where the amount of available memory of the host computing system does not satisfy the threshold amount of available memory; and accessing, by the virtual machine monitor, the memory location.

2. The method of claim 1, wherein accessing the memory location completes an instruction being executed by the guest virtual machine that triggered the memory access error.

3. The method of claim 1, wherein the virtual machine monitor determines whether the amount of available memory of the host computing system satisfies the threshold amount of available memory before any adjustment of the amount of memory allocated to the virtual balloon.

4. The method of claim 1, further comprising:

responsive to determining, based on the memory pressure, that the amount of memory allocated to the guest virtual machine can be reduced, increasing, by the virtual machine monitor, the amount of memory allocated to the virtual balloon.

5. The method of claim 4, further comprising:

responsive to the virtual machine monitor adjusting the amount of memory allocated to the virtual balloon, receiving an updated memory pressure, and selectively adjusting, based on the updated memory pressure, the amount of memory allocated to the guest virtual machine.

6. The method of claim 1, wherein receiving the memory access error comprises intercepting, by the virtual machine monitor, the memory access error before the memory access error is received by the guest virtual machine.

7. The method of claim 1, wherein monitoring, by the virtual machine monitor, the memory pressure of the guest virtual machine further comprises:

periodically retrieving pressure stall information from an operating system of the host computing system.

8. A computing system comprising:

a memory that stores instructions; and one or more processors that execute the instructions to:

allocate an amount of memory for a guest virtual machine, the amount of memory being less than a maximum amount of memory the guest virtual machine is configured to utilize, wherein the computing system provides an execution environment for the guest virtual machine; and after starting a boot process of the guest virtual machine:

monitor memory pressure of the guest virtual machine;

responsive to an attempt to access a memory location of the guest virtual machine that is unallocated, receive a memory access error that includes an indication of the memory location that was attempted to be accessed;

determine an amount of available memory of the computing system;

responsive to receiving the memory access error and based on the memory pressure and the amount of available memory of the computing system satisfying a threshold amount of available memory:

allocate additional memory for the guest virtual machine by at least reducing an amount of memory allocated to a virtual balloon, wherein the additional memory includes the memory location, and wherein the amount of memory allocated to the guest virtual machine is inversely proportional to the amount of memory allocated to the virtual balloon; and access the memory location; and responsive to receiving the memory access error and based on the memory pressure and the amount of available memory of the computing system not satisfying the threshold amount of available memory:

refrain from reducing the memory allocated to the virtual balloon.

9. The computing system of claim 8, wherein accessing the memory location completes an instruction being executed by the guest virtual machine that triggered the memory access error.

10. The computing system of claim 8, wherein the one or more processors further execute the instructions to determine whether the amount of available memory of the computing system satisfies the threshold amount of available memory before any adjustment of the amount of memory allocated to the virtual balloon.

11. The computing system of claim 8, wherein responsive to determining, based on the memory pressure, that the amount of memory allocated to the guest virtual machine can be reduced, the one or more processors further execute the instructions to increase the amount of memory allocated to the virtual balloon.

12. The computing system of claim 8, wherein responsive to adjusting the amount of memory allocated to the virtual balloon, the one or more processors further execute the instructions to:

receive, an updated memory pressure, and selectively adjust, based on the updated memory pressure, the amount of memory allocated to the guest virtual machine.

13. A non-transitory computer-readable storage medium comprising instructions, that when executed by one or more processors of a computing system, cause the one or more processors to:

allocate an amount of memory for a guest virtual machine, the amount of memory being less than a maximum amount of memory the guest virtual machine is configured to utilize, wherein the computing system provides an execution environment for the guest virtual machine; and after starting a boot process of the guest virtual machine:

monitor memory pressure of the guest virtual machine;

responsive to an attempt to access a memory location of the guest virtual machine that is unallocated, receive a memory access error that includes an indication of the memory location that was attempted to be accessed;

determine an amount of available memory of the computing system;

responsive to receiving the memory access error and based on the memory pressure and the amount of available memory of the computing system satisfying a threshold amount of available memory:

allocate additional memory for the guest virtual machine by at least reducing an amount of memory allocated to a virtual balloon, wherein the additional memory includes the memory location, and wherein the amount of memory allocated to the guest virtual machine is inversely proportional to the amount of memory allocated to the virtual balloon; and access the memory location; and responsive to receiving the memory access error and based on the memory pressure and the amount of available memory of the computing system not satisfying the threshold amount of available memory:

refrain from reducing the memory allocated to the virtual balloon.

14. The non-transitory computer-readable storage medium of claim 13, wherein responsive to determining, based on the memory pressure, that the amount of memory allocated to the guest virtual machine can be reduced, the one or more processors further execute the instructions to:

increase the amount of memory allocated to the virtual balloon;

responsive to adjusting the amount of memory allocated to the virtual balloon, receive an updated memory pressure, and selectively adjust, based on the updated memory pressure, the amount of memory allocated to the guest virtual machine.

15. The non-transitory computer-readable storage medium of claim 13, wherein accessing the memory location completes an instruction being executed by the guest virtual machine that triggered the memory access error.

* * * * *